UNITED STATES PATENT OFFICE.

P. MIOTT McGILL, OF WASHINGTON, DISTRICT OF COLUMBIA.

IMPROVEMENT IN ARTIFICIAL FUEL.

Specification forming part of Letters Patent No. 109,231, dated November 15, 1870.

*To all whom it may concern:*

Be it known that I, P. MIOTT MCGILL, of the city and county of Washington, and District of Columbia, have invented a new and useful process by which the dust or screenings of coal, anthracite and bituminous, can be agglutinated and returned to its original solid and compact state, and form a coal-rock or lump-coal for fuel equal in tenacity, hardness, and burning qualities to mined coal.

To every person engaged in coal-mining, coal-merchants, &c., the loss and annoyance arising from the ever-increasing accumulations of millions of tons of utterly valueless coal-dust are well known.

Many attempts have been made to utilize this material as a fuel by restoring it in some degree to its original compact and solid state, but so far all have proved abortive, from one cause or another, the principal of which was the impossibility of finding an agglutinant cheap enough to enable the fuel produced to compete with coal and the impossibility of forming an article of sufficient solidity and hardness to be able to resist the shocks consequent upon transportation, or to hold together while burning.

After many years of experimenting I have overcome all these defects, and have produced from coal-dust a fuel suitable for all the purposes for which coal is used, and which burns as long, bright, and as steady as lump-coal, producing more heat, less smoke, and no noxious smell, and which is capable of being handled and transported like ordinary coal, and sufficiently cheap to undersell all others.

The process by which I make my fuel is as follows: Having placed the coal dust or screenings and sawdust or peat in a suitable receptacle, I moisten the whole mass with a solution consisting of fluid silicate of soda, or soluble glass, and water, (preferably warm water,) with or without the addition of saltpeter. The mass is then mixed and agitated or kneaded until all the particles are thoroughly moistened, when it is let stand for some hours, during which time a partial decomposition takes place. The compound is then formed, by any suitable means, into cakes or lumps, as required, and left in the open air until the water is absorbed or driven off, when the particles of dust in the cakes or lumps will be found firmly cemented together by means of the solution before mentioned.

If the compound thus made be exposed before drying to a solution of chloride of calcium, double decomposition will be induced, and the silicate acid combining with the calcium will form silicate of lime, a cementing medium of great power, and which will aid in firmly attaching together all the particles of coal-dust.

If preferred, a vacuum may be produced in all the interstices of the coal-dust by means of pipes suitably arranged in the mass and connecting with exhaust-pumps, and the chloride of calcium forced into the mass at all points by means of atmospheric pressure.

A superior and very dense action of this fuel can be made by kneading the compound in a brick-machine and pressing it into cakes, and drying them in a kiln, like bricks.

A cheap mode of preparing a good article of the fuel is to spread the compound on a yard, paved or otherwise, and covered with a coating of dry coal-dust, and roll it down by means of heavy rollers, and after the whole has become sufficiently dry break it up to the proper size, as coal is broken.

The addition of sawdust and saltpeter, or either to the compound improves its igniting qualities, and, in a measure, improves the fuel.

The fuel formed as herein described ignites, owing to its component nature, more rapidly and burns as well as lump-coal, without producing any more smoke, and is free from all disagreeable smell. It answers all the purposes for which coal is used, and, being as solid and tenacious as lump-coal, can be transported with equal facility, while the expense of the materials of which it is composed is almost nominal. The price of its manufacture, when performed with machinery, which may be of the simplest construction, will not exceed one dollar per ton. Its quality, like that of lump-coal, will depend on the quality of the dust from which it is made.

A fuel well adapted for many manufacturing purposes can be made by agglutinating the dust and finer particles of coke in a manner similar to that above described. The fuel thus formed is entirely free from sulphur, and can be made very dense, I do not confine myself to any given proportion of the materials used, nor to the manner in which they are mixed, or the solvents applied, or to the mode of making the cakes or lumps of fuel, or to the manner in which they are dried; but What I do claim as my invention, and desire to secure by Letters Patent, is—

1. A fuel formed by cementing together particles of coal-dust, waste, or the screenings of coal by means of a solution of water-glass, with the addition of chloride of calcium, sawdust, and saltpeter, or either of them, so as to agglutinate and cement the particles together, and form, by means of the decompositions induced, and by kneading, pressing, and drying, a solid, hard, tenacious, and combustible substance for fuel, as herein described.

2. A fuel formed of coal-dust, waste, or the screenings of coal, and sawdust or peat, by means of a solution consisting of fluid silicate of soda and saltpeter, and exposing the mass so formed to a bath of chloride of calcium, so as to form, by means of the decompositions induced, and by kneading, pressing, and drying, a solid, hard, tenacious, and combustible substance for fuel, as herein described.

3. A fuel formed by cementing together particles of coke-dust by means of the agglutinate above described, in the manner set forth.

In testimony that I claim the foregoing invention I have hereunto set my hand this 1st day of January, 1870.

P. MIOTT McGILL.

Witnesses:
GEO. W. McGILL,
EDM. F. BROWN.